Patented Sept. 6, 1949

2,481,391

UNITED STATES PATENT OFFICE 2,481,391

PROCESS OF MAKING INSULATING AND ACOUSTICAL MATERIALS

John M. Campbell, Cleveland, Ohio, assignor to John M. Campbell and Philmore J. Haber as trustees No Drawing. Application May 15, 1945, Serial No. 593,964

7 Claims. (Cl. 106—75)

My invention relates in general to insulating material, and more particularly to vermiculite insulating material of the most useful properties, and the method of producing the same.

An object of my invention is to produce an insulating material having expanded vermiculite therein, but having better insulating properties than that of untreated expanded vermiculite.

Another object of my invention is to produce an insulating material in a body form which will retain its body form at high temperature.

Another object of my invention is to produce an expanded vermiculite mixture capable of extrusion without destruction to the particle form of expanded vermiculite.

Another object of my invention is to provide an insulating material resistant to crumbling at a temperature at least as high as 2270° F. and having a specific gravity under one.

Other objects and a fuller understanding of my invention may be had by referring to the following description and claims.

Vermiculite is a micaceous mineral made up of extremely thin sheets of material. Vermiculite is heated to expel water of crystalization and to expand it, and may then be screened or air separated, or may be used as it comes from the heater. It is preferable that extremely fine, or extremely large pieces of expanded vermiculite be excluded from use, however, coarser or finer particles may be used with good results.

The expanded product is approximately 27 times greater in volume than the original material. This is brought about by the described escaping of the water of crystallization. Some of the thin sheet or laminations are not completely separated, but are bulged out in the middle while remaining secure around the edges. The expanded product shows an open structure which reminds one of a paper Christmas bell structure when the bell is opened. However, most of the sheets are separated at least along a major part of their area. Thus, it can be seen, the expanded product is an extremely fragile material trapping many small air spaces therein. The high insulating property of the expanded material is due in part to the high coefficient of heat transmission of the material itself, and in part to the intrapped air spaces between the sheets of the material.

Heretofore, vermiculite has found only limited use in insulating materials and acoustical boards, because of the difficulty of preparing suitable finished products retaining the desirable insulating and acoustical properties of the original vermiculite. Each individual particle of expanded vermiculite is extremely vulnerable to external forces, and will break up or flatten out with very little rubbing or outside pressure. Therefore, methods used in the past, such as extruding or molding a mixture of vermiculite with water jell, resin, or other adhesives, resulted in a finished product of uncertain density, limited tensile strength, and definitely inferior resistance to calcining or checking under high temperatures.

The present invention contemplates the impregnation of the individual particles of expanded vermiculite with light weight powdered materials to support the fragile cells and laminations, the dispersion of an adhesive material by a peptizing agent in order that the adhesive may be thoroughly and evenly distributed throughout the vermiculite mass before taking on an adhesive property, and finally coagulating the adhesive by chemical manipulation to form an enveloping jell whereby the wetting action of the adhesive material is limited to exclude the adhesive from the interstices of the vermiculite and finally extruding or forming the jelled mass into usable shapes and drying. Various hardening agents, as well as auxiliary plasticizers and water-proofing agents may be added for the purpose of aiding in extruding the material, and in forming a more water-resistant material. Further, mineral fibers, glass fibers, or cellophane strips, and other fillers, may be added with the vermiculite to produce a material having varying tensile strength and acousticable properties. It is understood however, that the addition of the mineral fibers, the hardening agents, clay, water-proofing, color and any other auxiliary material is added only for the purpose of producing a material having specific desirable properties, and are in addition to the basic conception of supporting the individual cells by impregnation, and thereafter evenly dispersing an adhesive material by peptizing and later coagulating the adhesive material as a jell.

The following specific illustration is given for the purpose of a clearer understanding of the invention and is not intended to be a limitation of one particular process. The first step in the process, is to at least partly fill the voids between the individual layers of the expanded cells with a light weight powder to strengthen and support the individual cells. For this purpose, I use a combination of hydrated aluminum oxide and magnesium carbonate. The ratio between the two powders may vary anywhere from zero per cent of one and a hundred per cent of the second, to zero per cent of the second and one hundred percent of the first. However, to produce a material that is highly resistant to deterioration in water, and having a specific gravity less than one, I prefer to use a ratio of two parts of hydrated aluminum oxide to one part of magnesium carbonate. This mixture of powder may be either dry tumbled with the expanded vermiculite, or preferably be powder sprayed into the material in order that the powders may be forced deeply into the interstices of the expanded materials. However, dry tumbling will produce the satisfactory impregnation. Whichever way is used, the result will be expanded vermiculite with a considerable amount of the mixture of powdered materials penetrating the small cell-like laminations and clinging tenaciously within the interstices of the expanded vermiculite.

The next step is to moisten the impregnated cells with enough water to produce a moist mixture, but avoiding over-saturation. That is, there should not be sufficient water to drain off from the mixture. In one mode of operation, to this water before it is added to the impregnated cells, is added a small amount of a hardening agent which is at least slightly acidic when moist. For example, I have found that magnesium fluo-silicate, as disclosed in my application Serial No. 593,963, filed May 15, 1945, will serve to precipitate the adhesive binder as a jell, and at the same time serve to harden the adhesive material to better withstand the actions of high temperatures and mechanical forces. This hardening effect is particularly noticeable when using water glass as the binding agent.

After moistening the impregnated cells with the water solution of the acidic hardening agent, an adhesive material dispersed in water by a peptizing agent is slowly added, preferably by spraying, to the moistened cells with accompanying mixing. The adhesive material may be water jell, resin, silicate of resin, or similar materials which are commonly known for their adhesive properties. However, the common fault of these well-known adhesive agents is their tendency to over-saturate a portion of the material and to be too thinly dispersed in another portion. That is, great difficulty is usually experienced in evenly dispersing the adhesive material throughout the entire mixture. Therefore, I add a peptizing agent such as urea to hold the adhesive in a thin watery condition whereby the adhesive may be well distributed, before being reprecipitated from the fluid condition. At this point, the peptized adhesive material comes into contact with the slightly acidic hardening agent and is coagulated into the form of a viscous jell. It is pointed out, however, that a non-acidic hardening agent may be used, and an auxiliary acidic material added to produce the required pH value to cause the jell formation. The hardening agent is used to accentuate the fire resistant properties of the binder and to add to the erosion resistance thereof. The degree of viscousness is controlled by the amount of water, the amount of adhesive, and the amount of acidic hardening agent. Although the jell is described as being formed by precipitating the adhesive material by an acidic material, the principles involved include a precipitation of certain binders by a reverse procedure, that is, a precipitation by chemical manipulation to change the pH value to the basic side.

The formation of the described jell, is an exceedingly important and necessary step in the production of a superior grade of insulating material. It will readily be understood, that a jell material will not have the wetting properties of a thin fluid adhesive material or water. The jell, in other words, will resist entering into the interstices of the expanded vermiculite cells, and therefore the cells will not be loaded down with heavy adhesive material. This resistance to entry into the interstices of the expanded cells is greatly aided by the presence of the powdered materials previously impregnated to the interstices. That is, the dry powdered material acts to absorb the moisture from the jell and cause the jell to set up immediately into a hard supporting brace at the mouth of the various interstices. This action is somewhat akin to the action of placing extra flour in cake batter. The quick drying action of extra flour in a cake batter is well known. For example, a cake batter may be quite fluid and wet to the touch. However, the addition of a relatively small amount of dry flour will cause the batter to become a stiff pliable mass in a very short period of time. Therefore with my improved method of distributing adhesive material within the expanded vermiculite, each individual expanded cell is provided with a strong support at the opening of each interstice, or in other words, the openings between the various layers are blocked and supported by the quickly congealed and solidified adhesive material. Further, the described method of forming a jell of the adhesive material after the adhesive material has been mixed into the mixture of wetted cells prevents the adhesive material from saturating the expanded cell in one portion of the mixture to the extent of completely filling the space between the various layers of the expanded cells, and insufficiently adhering to the cells of another portion. In this manner, I am able to support the expanded vermiculite cells to prevent the destruction of the excellent insulating properties thereof during a mechanical working as the material is worked to form the mixture into usable shapes. Further, because the individual cells of vermiculite are thus not filled with binder, the resultant mass has a lower density than would result from using a liquid binder which has the ability to more completely fill the interstices of the base material.

The jell formed as described, serves somewhat as a lubricating agent to permit the finished mixture to be extruded into various shapes such as boards, tubes, and various other shapes. However, in order to increase the lubricating properties of the wet mixture, I have found that it is advantageous to add an auxiliary lubricant such as clay or talc. However, an excess of clay is to be avoided because of the tendency of even the best of clays to calcine or deteriorate under high temperatures. Water-proofing materials, color, and so forth may be also added before the material is extruded for specific purposes if desired.

It will be noted, that all the materials used in this example are of a nature to be non-deteriorating under intense temperatures. The magnesium carbonate, for example, used to fill the interstices of the vermiculite, may be replaced by magnesium oxide. However, the magnesium carbonate is useful in that carbon dioxide is given off during the mixing of the vermiculite with the slightly acidic hardening agent. The end product, of course, is magnesium oxide, but the slight evolution of carbon dioxide serves somewhat as a leavening agent similar to the action of baking powders when making pastries. The leavening action tends to create voids within the material and thus reduces the specific gravity and decreases the heat conducting properties of the material. Certain decomposable fillers may also be added in order that lighter weight and more porous material may be obtained. The decomposable material is driven off as a gas during the drying period by heating the mass in ovens.

After this described material has been formed into shapes, it may be allowed to air dry or may be forced dried in ovens. Nevertheless, the material is tenacious when extruded or formed even when wet and may be handled to some extent without breaking. After drying this material has been found to resist successfully the temperatures created by burning magnesium metal for an extended period of time. After subjecting this material to temperatures of 2270° F. for a period of an hour or more, the materials gave no indication of checking or cracking and was as suitable for its intended purpose as it was before the exposure to the extreme temperature. Further, this material has exhibited extremely good insulating properties. For example, a ¾" board of this material was found to sustain burning magnesium on one side without conducting enough heat to cause discomfort to the human hand held on the other side. This extreme insulating property is attributed to the preservation of the cell-like structure of the original vermiculite cell by the described improved method while binding them together during manufacture.

Although my invention has been described thus far as a method of supplying a binding agent to vermiculite and like materials, the resulting material has been found to exhibit heat resistance properties definitely superior to the heat resistant properties of mineral vermiculite. The untreated expanded vermiculite, for example, will char and deteriorate at a temperature well below the temperature created by burning magnesium. On the other hand, when formed into insulating material according to my improved process, the resulting product was not able to withstand the temperature of the burning magnesium without charring or deteriorating, but actually remains as useful as before exposed. It is believed that this improved insulating quality is largely contributed by the enveloping of the vermiculite particles in the coating of insulating and heat resisting powders in the form of aluminum oxide and magnesium oxide. The excess material not forced into the interstices of the particles, is believed to aid the vermiculite particles by excluding heat from the interior of the finished product. Aluminum oxide and magnesium oxide of course, are well known for their ability to withstand the highest of temperatures.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. The process of producing an insulating material, comprising the steps of spraying expanded vermiculite with powdered materials selected from the group consisting of oxide of magnesium and aluminum by means of a powder spray for the purpose of at least partially filling the interstices of the expanded vermiculite with the said powdered materials, thereafter adding a jell having adhesive binding properties when dry, the said jell comprising principally sodium silicate, magnesium fluosilicate, urea, and water, and thereafter adding clay to increase the plasticity of the mass, and finally extruding into shapes.

2. The process of producing an article of manufacture, comprising the steps of providing particles of material having a multiplicity of interstices therein, at least partly filling the interstices of the individual particles with powdered thermally non-decomposing materials selected from the group consisting of oxides of aluminum and magnesium, thereafter mixing the filled particles with an acidic solution in quantities sufficient to moisten the surfaces of the individual particles, separately preparing a binder of peptized aqueous dispersions of sodium silicate and urea, and thereafter mixing the binder with the filled particles while the filled particles are still moist with the acidic solution, whereby the peptized dispersion is precipitated as an adhesive gel, and thereafter shaping into forms and drying.

3. The process of producing an article of manufacture, comprising the steps of providing particles of material having a multiplicity of interstices therein, at least partly filling the interstices of the individual particles with finely powdered aluminum hydrate, thereafter mixing the filled particles with an acidic solution in quantities sufficient to moisten the surfaces of the individual particles, separately preparing a binder of peptized aqueous dispersion of sodium silicate and urea, and thereafter mixing the binder with the filled particles while the filled particles are still moist with the acidic solution, whereby the peptized dispersion is precipitated as an adhesive gel, and thereafter shaping into forms and drying.

4. The process of producing an article of manufacture, comprising the steps of providing particles of material having a multiplicity of interstices therein, at least partly filling the interstices of the individual particles with magnesium oxide, thereafter mixing the filled particles with an acidic solution in quantities sufficient to moisten the surfaces of the individual particles, separately preparing a binder of peptized aqueous dispersion of sodium silicate and urea, and thereafter mixing the binder with the filled particles while the filled particles are still moist with the acidic solution, whereby the peptized dispersion is precipitated as an adhesive gel, and thereafter shaping into forms and drying.

5. The process of producing an article of manufacture, comprising the steps of providing particles of material having a multiplicity of interstices therein, at least partly filling the interstices of the individual particles with aluminum hydrate and magnesium carbonate in the ratio of two parts aluminum hydrate to one part magnesium carbonate, thereafter mixing the filled particles with an acidic solution in quantities sufficient to moisten the surfaces of the individual particles, separately preparing a binder of peptized aqueous dispersion of sodium silicate and urea, and thereafter mixing the binder with the filled particles while the filled particles are still moist with the acidic solution, whereby the peptized dispersion is precipitated as an adhesive gel, and thereafter shaping into forms and drying.

6. The process of producing an article of manufacture, comprising the steps of providing particles of material having a multiplicity of interstices therein, at least partly filling the interstices of the individual particles with powdered thermally non-decomposing material selected from the group consisting of oxides of aluminum and magnesium metals, thereafter mixing the filled particles with a solution of magnesium fluosilicate in quantities sufficient to moisten the surfaces of the individual particles, separately preparing a binder of peptized aqueous dispersion of sodium silicate and urea, and thereafter mixing the binder with the filled particles while the filled particles are still moist with the magnesium fluosilicate solution, whereby the peptized dispersion is precipitated as an adhesive gel, and thereafter shaping into forms and drying.

7. The process of producing an article of manufacture, comprising the steps of providing particles of material having a multiplicity of interstices therein, at least partly filling the interstices of the individual particles with powdered thermally non-decomposing materials selected from the group consisting of oxides of aluminum and magnesium, separately preparing a binder of peptized aqueous dispersion of sodium silicate and urea, thereafter mixing the binder with the filled particles and precipitating the sodium silicate in gel form, by contacting the said dispersion with acidic material to shift the pH value of the peptized sodium silicate and urea solution, and thereafter shaping into forms and drying.

JOHN M. CAMPBELL.

REFERENCES CITED

The following references are of record in the file of this patent:

UNITED STATES PATENTS

| Number | Name | Date |
|---|---|---|
| 1,454,780 | Willett | May 8, 1923 |
| 1,830,253 | Bechtner | Nov. 3, 1931 |
| 1,921,468 | Jack, 3rd | Aug. 8, 1933 |
| 2,077,094 | Byers | Apr. 13, 1937 |
| 2,114,692 | Ward | Apr. 19, 1938 |

Certificate of Correction

Patent No. 2,481,391 — September 6, 1949

JOHN M. CAMPBELL

It is hereby certified that error appears in the printed specification of the above numbered patent requiring correction as follows:

Column 5, line 42, after the word "not" insert *only*;

and that the said Letters Patent should be read with this correction therein that the same may conform to the record of the case in the Patent Office.

Signed and sealed this 9th day of May, A. D. 1950.

[SEAL]

THOMAS F. MURPHY,
*Assistant Commissioner of Patents.*